US009171195B1

(12) United States Patent
Rybakov et al.

(10) Patent No.: US 9,171,195 B1
(45) Date of Patent: Oct. 27, 2015

(54) RECOGNIZING THREE-DIMENSIONAL OBJECTS

(71) Applicant: Amazon Technologies, Inc., Seattle, WA (US)

(72) Inventors: Oleg Rybakov, Seattle, WA (US); Avinash Aghoram Ravichandran, Seattle, WA (US); Matias Omar Gregorio Benitez, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/305,492

(22) Filed: Jun. 16, 2014

(51) Int. Cl.
*G06K 9/62* (2006.01)
*G06K 9/00* (2006.01)

(52) U.S. Cl.
CPC .................................. *G06K 9/00208* (2013.01)

(58) Field of Classification Search
None
See application file for complete search history.

(56) References Cited

U.S. PATENT DOCUMENTS

| | | | | |
|---|---|---|---|---|
| 6,144,755 A | * | 11/2000 | Niyogi et al. | 382/118 |
| 6,687,386 B1 | * | 2/2004 | Ito et al. | 382/103 |
| 7,190,814 B2 | * | 3/2007 | Miichi et al. | 382/118 |
| 8,401,342 B2 | | 3/2013 | Ruzon | |
| 8,406,507 B2 | | 3/2013 | Ruzon | |
| 8,682,071 B1 | * | 3/2014 | Dhua et al. | 382/170 |
| 2005/0025357 A1 | * | 2/2005 | Landwehr et al. | 382/170 |
| 2011/0206244 A1 | * | 8/2011 | Munoz-Bustamante | 382/118 |
| 2012/0051634 A1 | * | 3/2012 | Chong et al. | 382/165 |
| 2013/0322772 A1 | * | 12/2013 | Seo et al. | 382/209 |

* cited by examiner

*Primary Examiner* — Brian P Werner
(74) *Attorney, Agent, or Firm* — Seyfarth Shaw LLP; Ilan N. Barzilay; Joseph M. Walker

(57) ABSTRACT

An object recognition system may recognize an object in a query image by matching the image to one or more images in a database. The database may include images corresponding to multiple viewpoints of a particular device. Key points of the query image are compared to key points in the database images. Database images with many overlapping key points to the query image are selected as potential matches. The geometry of objects in the potential matches is verified to the geometry of the object in the query image to determine if the overlapping key points have a similar geographic relationship to each other across images. Objects in geometrically verified database images may be selected as potentially matching objects to the object in the query image. When a potential matching image is found, the system may confirm the match by performing matching with a second image of the object.

20 Claims, 6 Drawing Sheets

RECOGNIZING THREE-DIMENSIONAL OBJECTS

BACKGROUND

Mobile computing devices are commonly equipped with cameras and other sensors that may be used to identify real world objects encountered by users. For example, images taken from one device may be compared to a database to recognize objects in the images. The user may then be presented with additional information about the recognized object, including the option to purchase the recognized object.

BRIEF DESCRIPTION OF DRAWINGS

For a more complete understanding of the present disclosure, reference is now made to the following description taken in conjunction with the accompanying drawings.

DETAILED DESCRIPTION

Image matching is a fundamental technique that is being used in computer vision, object recognition, motion tracking, three-dimensional (3D) modeling, and the like. Image matching is performed to check whether two images have the same content. The two images to be compared may not be exactly the same. For example, one image may be rotated or taken from a different viewpoint as compared to the other image, or it may be a zoomed version of the other image. Further, the two images may be taken under different lighting conditions. Various image matching and image processing techniques may be used to correct for such differences.

One particular difficulty encountered in image matching is identifying real-world 3D objects when comparison images, such as those stored in a database, are two-dimensional. If an image to be matched depicts an object at a different angle from the database images, present image matching systems may be unable to perform image matching and the object may go unrecognized. This may lead to unsuccessful attempts by a user to take multiple images of an object to be recognized, hoping that one of the images may match the perspective and/or angle of a database image. This can lead to a frustrating, and potentially unsuccessful user experience when attempting object recognition.

Offered is a system and techniques to improve recognition of 3D objects and to improve a user experience when performing object recognition and/or image matching.

Traditionally, image matching is performed between planar two-dimensional images. To recognize and match an object in an image, therefore, the representation of the object in one image must be taken from approximately the same angle as the representation of the object in the potentially matching image, otherwise the object will be difficult, if not impossible to recognize across images. One possible solution to this problem is 3D modeling of an object, however this may be cost prohibitive and/or simply impractical when building a database of many objects to be recognized.

Proposed is a solution to use sparse representations of a 3D object, that may then be recognized from varying angles using image matching techniques discussed herein. For example, several images of a particular object may be taken from multiple points of view (for example, left view, right view, top view, bottom view, etc.). These images from the multiple points of view may then be used to train a planar recognizer. Geometric verification techniques, such as those described below, may then be used to confirm that an object in a query image matches an object in a stored database image. In this manner, recognition of 3D objects may be performed in the absence of a 3D model.

Figure 1:
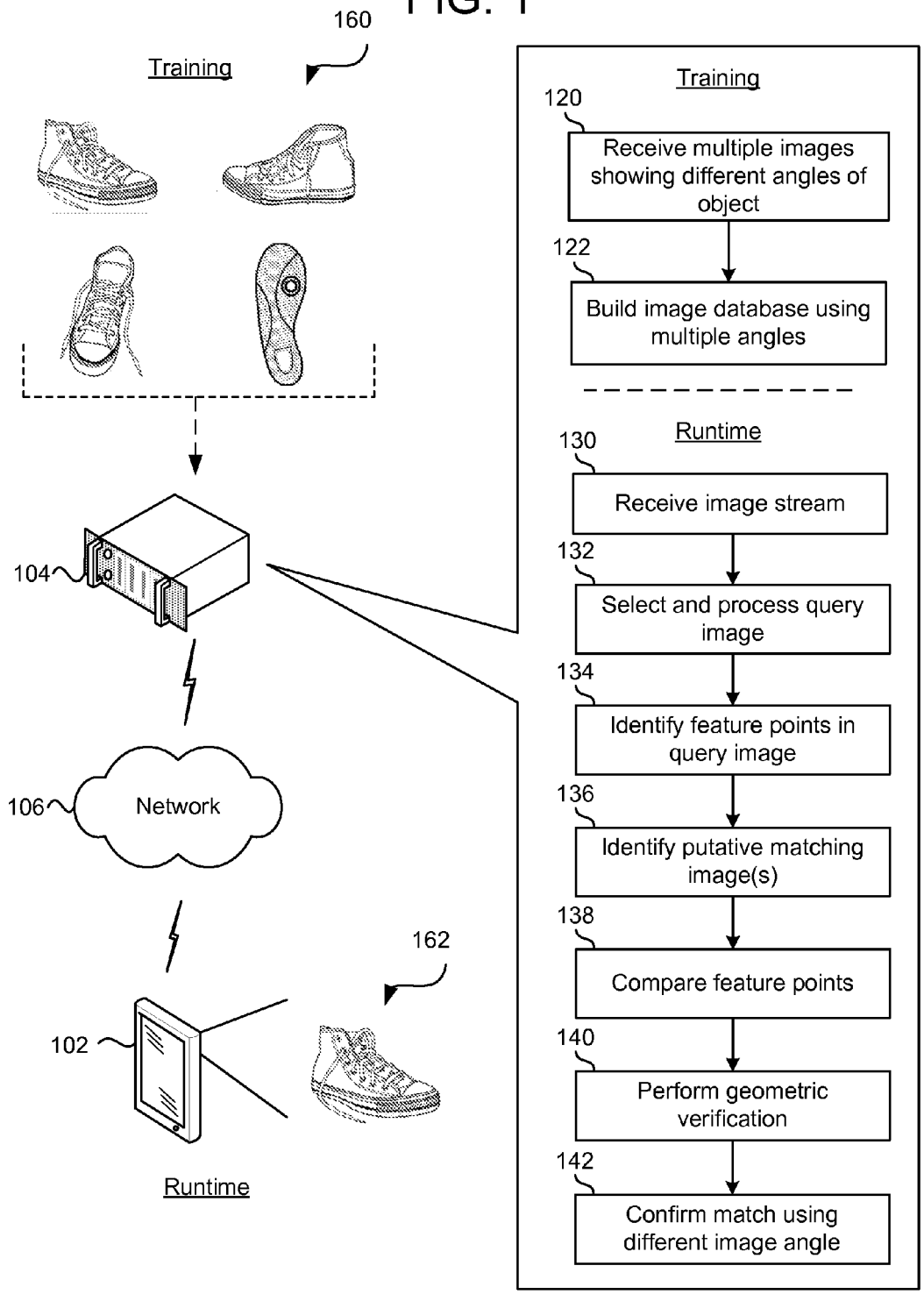
FIG. 1 illustrates an overview of a system for recognizing three dimensional objects according to aspects of the present disclosure.

A system for performing recognition of three-dimensional objects is illustrated in FIG. 1. As shown, a server 104 that performs image recognition may, during a training period, receive multiple images showing different angles of an object (120). The server 104 may build an image database using the multiple angles (122). The server 104 may also perform pre-processing on these images to identify feature points and keywords (as described below) to potentially match images in the database with incoming images. The database images may be associated with certain objects or object IDs so images of incoming objects may be recognized. For example, different images 160 of shoes may be taken from different angles, processed, and stored in an image database on the server 104 or elsewhere.

At runtime, the server 104 may receive a communication from a user device, such as smartphone 102 over a network 106 or through another communication method. The communication may include a request to identify a specific object seen by a camera(s) of the device 102. The device 102 may send video/image data from its camera(s) to the server 104. The image data may be sent as a stream of images taken from the camera(s) and may be pre-processed by the device 102 before sending (for example to improve image quality, etc.). The stream may be a continuous series of images taken by the device 102 and sent to the server 104 as the images are taken by the device 102. For example, the stream may be a series of images taken from a camera of a mobile device as a user holds or moves the mobile device near an object, thus capturing many different images of the object that may be processed for matching. The stream may start at a certain time (for example, in response to a user selection of a button or function) and may stop at a certain time (for example, in response to a new user selection of a button, or in response to a message from the server 104 that a sufficient number of images has been received). The server 104 then receives the image stream (130). The image stream may not include an image of the object that directly matches the angle of one of the images taken during training, however the multiple angles of the object allow the server 104 to perform different checks of different images of the same object. The server 104 then selects and processes an image to be matched (called a query image) (132). The server 104 identifies features points of the query image (134). The features may include feature points of the image (as described below), textures in the image, colors in the image, etc. The server 104 then identifies one or more putative matching database image(s) for the query image (136). To test the putative matches, the server 104 compares a representation of the first image to a representation of the second image. For example, the server 104 compares features between the putative matches and the query image (138). The server 104 may then perform geometric verification to confirm whether a putative matching image is an actual match (140). When a potential matching image is identified (or multiple matches are identified) the server 104 may determine an object identifier associated with an object shown in the potential matching image. The server 104 may then confirm the match between the object in the query image and the object in the potential matching image by using the object identifier to find a second database image of the potential matched object. The server 104 may then confirm the object identification by attempting to match the query image with another database image of the same object taken from a different angle (142). Processes such as feature point matching and geometric verification may again be used for this second angle image. If the results of the second comparison are above a threshold, the represented object may be determined to be a match. The server 104 may then return results to the user based on that object identifier. The results may include identification information for the object, the option to purchase the object, etc.

As a runtime example, a device 102 may send an image stream showing a shoe 162 to the server 104. The server 104 may select an image from the image stream (for example a frame of video) to compare with the database images. The server may then compare that selected video frame to a number of database images using the techniques described below to identify a potential matching image showing a potential matching object (i.e., shoe model). The server may confirm the match by attempting to match the selected video frame to a second image of the potential matching shoe model. If the second image is a close enough match to the video frame, the server may determine that a match has been found and return information about the match to the user.

The above techniques may be implemented in a system combined with the techniques and components described below.

The images may be of different formats such as JPEG, GIF, BMP, MPEG, and the like. Further, the quality and resolution of these images may vary from one application to another. Further, the images need not be exactly the same but a transformed version of each other. Therefore, in the image matching algorithm the image is represented in a particular format so that the images can be matched with each other.

Image matching algorithms, such as those described here, may take advantage of the fact that an image of an object or scene contains a number of feature points. Feature points are specific points in an image which are robust to changes in image rotation, scale, viewpoint or lighting conditions. This means that these feature points will often be present in both the images, even if the two images differ in the manner described earlier. These feature points may also be known as "points of interest." Therefore, a first stage of the image matching algorithm may include finding these feature points in the image. An image pyramid may be constructed to determine the feature points of an image. An image pyramid is a scale-space representation of the image, i.e., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be purchased (or simply identified), this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted query images.

Figure 2:
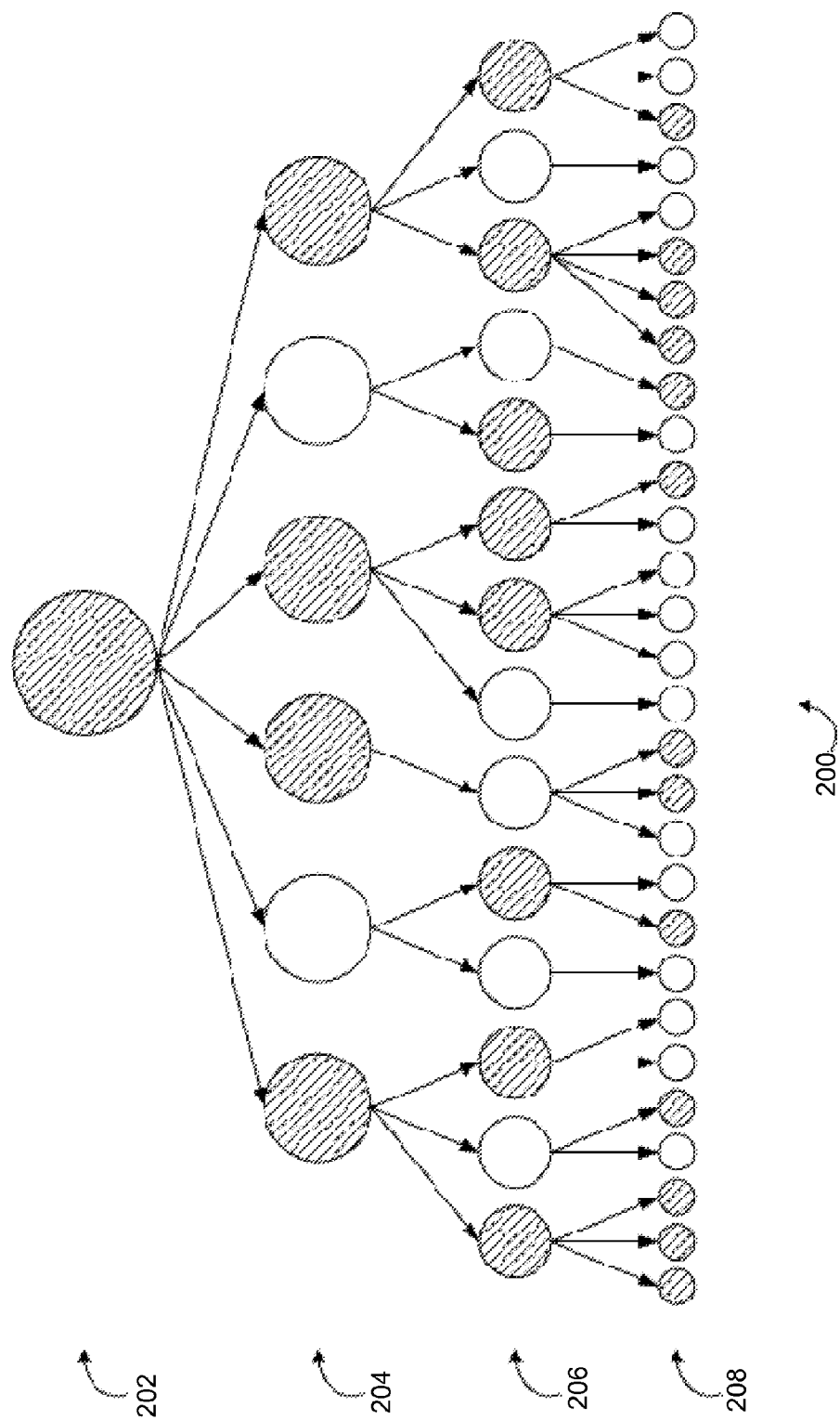
FIG. 2 is a schematic diagram depicting aspects of an example visually significant subset of a category tree according to aspects of the present disclosure.

FIG. 2 depicts aspects of an example visually significant subset of an example category tree 200 in accordance with at least one embodiment. The category tree 200 has a first level 202 containing the root category of the category tree 200, second and third levels 204, 206 containing categories with one or more sub-categories or child categories, and a fourth level 208 containing childless categories or leaf categories of the category tree 200. In FIG. 2, categories in the visually significant subset of the category tree 200 are indicated by a circle filled with diagonal lines. Each visually significant category need not have a visually significant parent category in the category tree 200. Visually significant categories in the category tree 200 may be referenced and/or defined by the visually significant category data.

Visually significant category data may be stored in an object along with other data (such as an identifier) and associated with other objects, such as a parent item data object, child item data object, image data object, etc. For example, data objects associated with items on level 206 of the tree 200 may be associated with parent data objects on level 204 of the tree 200 and/or may be associated with child data objects on level 206 of the tree 200. For example, where items on the tree correspond to physical objects, a set of child items may correspond to physical variations of a parent item such as variations in size and/or color.

A tree of images and corresponding data may be configured in a number of ways, and split based on a number of factors. For example, trees may be organized using unsupervised clustering, for example hierarchical k-means clustering where tree levels may have clusters of features grouped based on their relevance to each other, with higher and lower levels of clusters of parent/child features. Trees may also be organized using supervised clustering, where certain meta or semantic information may be used to structure the tree. For example, different branches of a tree may correspond to different object categories, different viewpoints, or other meta information.

In one aspect, the system may include multiple trees. Each tree may constructed with different angles of various objects, for example one tree may include only top-view images of objects whereas another tree may include only left-hand images of objects. If trees are configured in this manner, when performing image comparison an initial determination may be made regarding the image to be matched to determine which tree to search for a potential match (for example, the image to be matched is a top view image so search the top view tree). In another example, trees may be constructed using hierarchical clustering of visually significant image features where different trees may have combined views (for example, all side views together, etc.) so that similar visually significant features may be clustered on the trees (as explained below). Other arrangements of multiple trees may be used.

When performing image matching, the system may search images on a tree by traversing the branches of the tree (or branches of multiple trees in parallel) according to one or more logical progressions. In a multiple tree configuration, the system may process trees in parallel when identifying candidate match(es). When traversing multiple trees, the system may traverse each tree completely, and the potential candidates resulting from each tree traversal compared against the query image. The most closely matching candidates may then be selected as putative matches. In another example, as each tree is traversed, a score may be tallied representing a likelihood that the tree (or particular branch of the tree) is likely to include a match for the query image. If the score passes below a threshold, thus indicating that the particular tree/branch is unlikely to include a match, the system may discontinue searching that tree/branch. Other progression/traversal techniques may be used. These particular techniques are known to those skilled in the art and are beyond the scope of this application.

Figure 3:
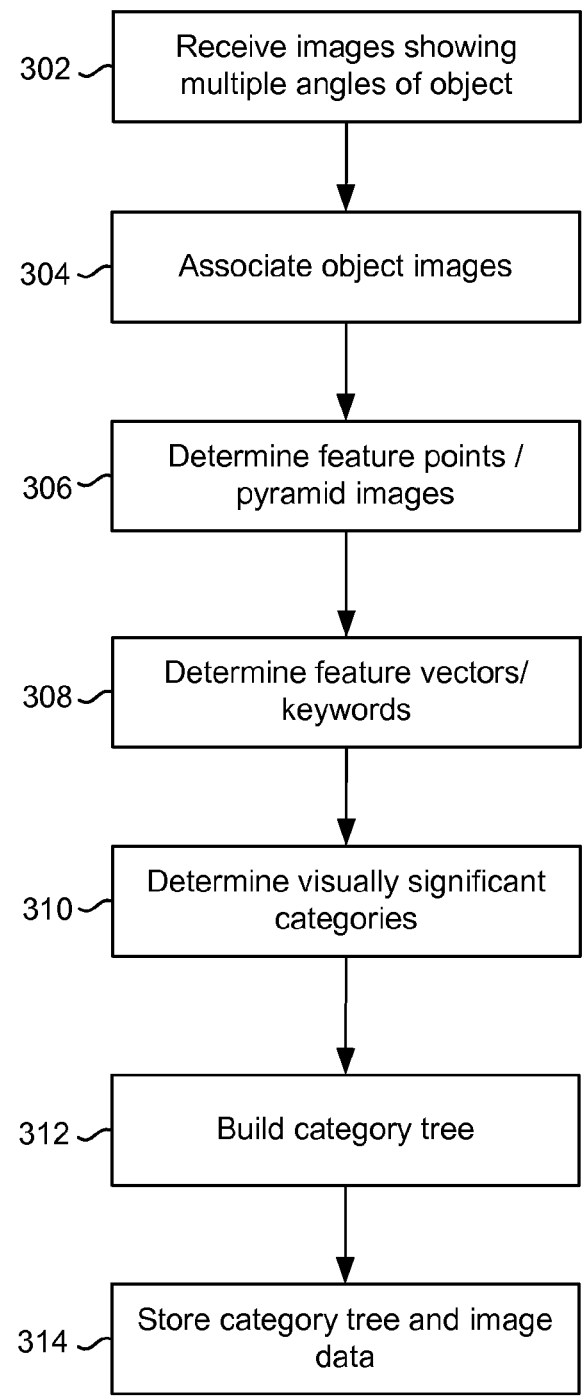
FIG. 3 illustrates an example process for configuring an image database according to aspects of the present disclosure.

FIG. 3 illustrates an example process for configuring an image database. A server 104 receives multiple images, each image showing a different angle of an object (302). The server may associate images showing angles of a same object together (304) either as part of a tree (discussed below) or separately. An object identifier (which may be a unique alphanumeric code) corresponding to a displayed image may be associated with an image showing the object. The database images may include only one object per image (which assists in image mapping) or, in certain instances, may include multiple objects in one image. In that case, the particular image may be associated with the multiple object identifiers corresponding to the displayed images. The server 104 may determine feature points and/or pyramid images (306) for the database images. These feature points and pyramid images are associated with their corresponding images. The server may also determine feature vectors, keywords, and/or other representations or features of the contents of the images (308). These representations features may include other factors such as texture, color, etc. that may be used when determining putative matching images as discussed below. The server 104 may then determine visually significant categories into which the images may organized in a tree (310). The categories may be determined based on feature points, pyramid images, representations, or other data associated with the objects. The server 104 then builds the category tree (312) based on the above data. The tree may be configured in a variety of ways. Features may be clustered and organized on the tree based on visually significant categories. Each node of the tree may correspond to an object. The server 104 may build multiple trees corresponding to different configurations as described above. Data associated with the tree may be stored at the server 104 or at one or more other locations (314).

An image matching process may start with an image to be matched to the database of images. The image to be mapped may be referred to as a query image. The query image may depict an object to be recognized. To identify the query image, a user may select the query image or may simply point a camera of a user device at an object. The camera of the user device may then capture multiple images of the object, for example a streaming series of images, and send them to a server or remote device for recognition. The user device and/or the server may perform some processing on the incoming stream of images to determine which images to use as one or more query images. The processing may include image enhancement, contrast adjustment, or other effects to create one or more images that may be easily processed by the server when performing image matching. The processing may also include determining whether one or more images in the stream of images is taken from an angle that is more likely to be recognized by the server. One or more images from the stream of images may be selected as a query image and processed to perform image matching as described below. In one embodiment, the system may perform image matching for multiple images in the incoming stream of images and compare the ultimate results to determine if the same object is recognized in different images from the stream (thus assisting in confirming the recognized object if identified multiple times or in determining an incorrect object was identified if different objects are identified across images from the same stream). Other processing examples may also be performed.

The ultimate database image that matches the query image (i.e., depicts the same object as the query image) may not be exactly the same as the query image. For example, the query image may be a scaled, rotated, tilted, or zoomed version, or any other possible transformation of the matching image. The image matching algorithm of the present invention finds a match of query image from among multiple database images. As explained below, the image matching algorithm may operate by representing images in terms of feature points, orientations and feature vectors. After a representation of the query image and database images has been created, the feature points, orientations and feature vectors of the images are used to determine a match between the images.

Feature points may be identified in an image (such as a pyramid image) using a variety of techniques, such as finding the Harris corner measure at different points in the pyramid image. The local maxima in the Harris corner measure may be identified as feature points. Feature points may appear in a main region of an image or at edge of the image. After determining the feature points of pyramid images in the image pyramid, an image matching algorithm may determine the orientation of each feature point. The orientation of a feature point may be determined based on the local image gradient at the feature point. Orientation is used to obtain invariance to rotation. After the feature points and their orientations are determined, a patch may be extracted around the feature point in such a way that the orientation vector forms one axis of the reference frame for the patch. The local image gradients on this patch are calculated and transformed into a feature vector representation. The feature vector representation takes into account significant change in local distortion and illumination, i.e., the feature vector is invariant to distortion and change in lighting conditions. The feature points, their orientations and their feature vectors over multiple pyramid images may be used to form an overall representation of the image. This overall representation of the image may be described as a keyword. They keyword may be a mathematical function or other combination of data describing the image such as feature points, feature point data, etc. The keywords, or other representations of images may be compared across images to find one or more putative matching images. The putative matching images may be tested and/or confirmed by comparing feature points, motion estimation, or other techniques as described below. Techniques for performing the above steps, as well as other steps for image matching, are also described in detail in U.S. Pat. No. 8,401,342, entitled "SYSTEM AND METHOD TO MATCH IMAGES," and issued on Mar. 19, 2013 and U.S. Pat. No. 8,406,507, entitled "METHOD AND SYSTEM FOR REPRESENTING IMAGE PATCHES," and issued on Mar. 26, 2013, (together "the Referenced Patents") the contents of which are hereby expressly incorporated by reference in their entireties.

A query image may be matched to a database image based on matching the feature points between the two images. First, a potential match for a query image may be found in the database images based on the keyword of the query image and the keyword of the database image (or other image descriptor). Potential matching images may be referred to as putatively matching images. If the keywords of putatively matching images are close enough, the system may compare feature points between the images. The pair of putatively matching images can be determined to be a match when a sufficient number of feature points match the corresponding feature points of the other image both visually and geometrically. Feature vectors that are close to each other are visually similar, and the corresponding feature points are called "putative correspondences" or "correspondences." The putative (i.e., potential) correspondences may be determined by finding dot products between feature vectors of the query image and feature vectors of database images. The pair of feature points is a putative correspondence when the magnitude of the dot product of their feature vectors is greater than a predefined value. The putative correspondences may then be processed by a statistical algorithm to test geometric consistency.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

One problem associated with using this type of method is that the set of possible transformations generated by the statistical algorithm may be larger than the set of physically valid transformations. For example, the transformation may flip one side of a rectangle, causing a twist that is impossible to achieve with a rigid object. In another example, it may flip the entire rectangle, a transformation that is achievable by taking a picture of a reflection of the object. This can lead to incorrect matching of images. Further, this can cause unnecessary computation, since analysis of parameters/points generated by the transformation is done even though the transformation itself may be physically invalid or infeasible.

In applications where rotational invariance is desired, for a transformation to be valid, it should preferably preserve the orientations of the two feature points in a putative correspondence. Even if the putative correspondences are determined to be closely matching, the putative correspondences alone may not ensure that the pair of images forms a final match. Putative correspondences give the information about visual similarities between feature points of the pair of images. This may not be sufficient to determine the final match between the pair of images. There is a possibility that corresponding areas of both images may generate multiple putative correspondences. For instance, if an image feature is salient at more than one scale, multiple feature points may be generated, possibly resulting in multiple putative correspondences. Choosing one of these putative correspondences to generate the transformation may result in other putative correspondences also becoming inliers, thereby creating a false sense of information that the two images that are matched using this transformation are truly matching. In other words, using only putative correspondences may not provide enough information so as to establish a clear match between the query image and the database images.

Moreover, it might be possible that the two images may share an element or a small part of the image, like a logo for a corporation or other entity. The images may also share a piece of text in the same font. These shared elements may create enough inliers to declare an image match, while in reality the two images are not similar.

To further test pairs of putative corresponding feature points between images, after the putative correspondences are determined, a topological equivalence test is performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (i.e. the query image) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

Motion estimation may include a transformation to explain relative motion between the two images. The transformation may include a homographic transformation between the query image and the database images. A homography is a transformation that encodes rotation, scaling and foreshortening of the query image. Homographic transformation, and other details of motion estimation may be found in the Referenced Patents. If putative correspondences map to each other through the homography, they may be considered inliers. After establishing the inliers, a comparison is made between the total number of inliers found and a threshold. If too many putatively corresponding feature point pairs are too far apart from each other based on a configured threshold (i.e., those pairs are outliers), the two images being compared may be declared to be a mismatch. If a sufficient number of putatively corresponding feature point pairs are close enough in terms of geometric comparison (i.e., those pairs are inliers), then the two images being compared may be considered to be a putative match.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results to a user. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

When a database image is selected as a match to the query image, the object in the query image may be determined to be the object in the matching database image. An object identifier associated with the database image (such as a product ID or other identifier) may be used to return results to a user, along the lines of "your object has been identified as product X" along with other information, such giving the user information about the product or giving the user the opportunity to purchase the product. If multiple potential matches are returned (such as when the system can't determine exactly what object is found or if multiple objects appear in the query image) the system may indicate to the user that multiple potential matching objects are found and may return information/options related to the multiple objects.

Figure 4:
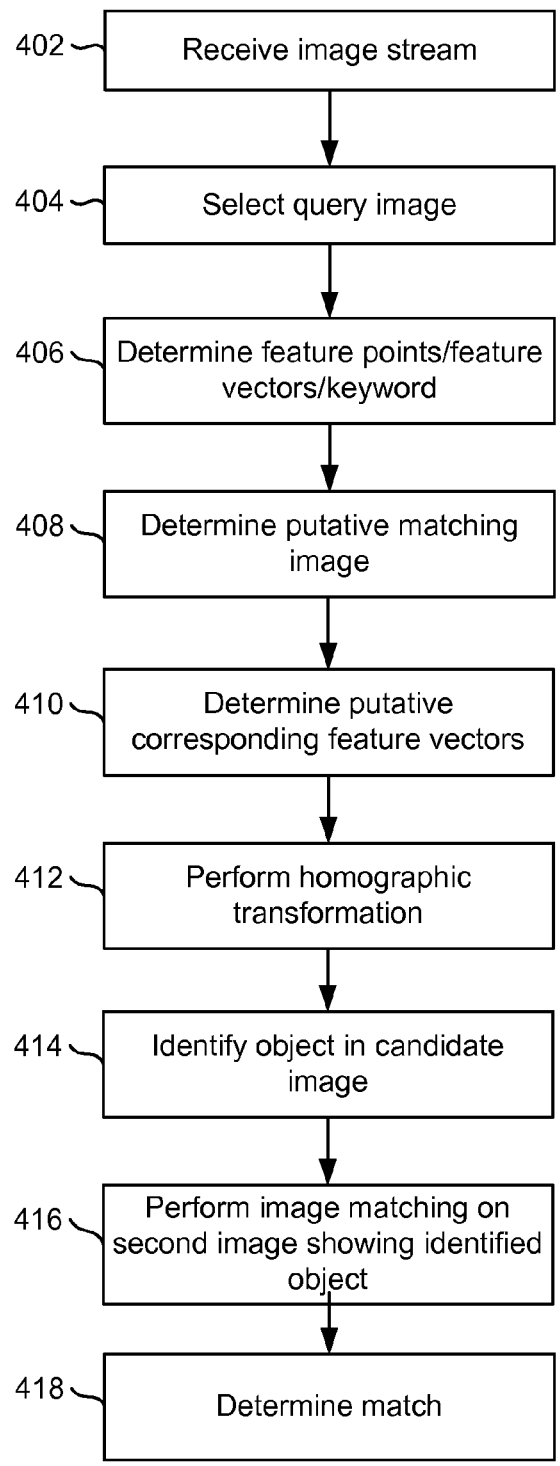
FIG. 4 illustrates an example process for image matching and object recognition according to aspects of the present disclosure.

FIG. 4 illustrates a process for identifying an object using image matching techniques according to various aspects of the present disclosure. An object recognition system (as executed by server 104 or other device) may receive an image stream (402). The image stream may be received from a user operating a device in communication with the server 104. Alternatively, the system may only receive a single image (or some other group of images rather than a stream of images). The system may perform some pre-processing on the received image(s) to enhance image quality (such as adjusting exposure, focus, lighting, cropping, etc.) and may select a frame or image from the group of images (404) to perform image matching. The selected image is the query image. The system may then determine feature points, feature vectors, a keyword, or other representations (such as texture, color, etc.) of the contents of the query image (406). The keyword may be determined based on a mathematical function related to the feature points and/or feature vector of the query image.

The system may use one or more representations of the image (for example, the keyword) to determine one or more putative matching images in the image database (408). The system may identify visual features of the query image (such as those indicated in the keyword) and traverse an image/object tree based on the visual features to identify one or more putative matching images from among the database images. Comparisons between the query images and database images may generate one or more scores, including a matching score, confidence score, etc. Based on the score values (which may be computed in a number of ways depending on system configuration), the system may selective putative matching images. For example, if a comparison of a database image to a query image generates a score above a certain threshold, the database image may be selected as a putative matching image.

The system may then determine putative corresponding feature vectors between feature vectors of the query image and feature vectors of a putative matching image (410). The system may also perform a homographic transformation (412) or other geometric verification to check the geometries between the query image and putative matching image. If the comparison of feature vectors, other features/representations, and homographic transformation result in sufficiently high score(s) (such as a comparison score, confidence score, etc.), the putative matching image may be determined to be a candidate image. Determining a candidate image may involve determining if a number of inliers of exceeds a certain threshold. When a candidate image is determined, the system may identify an object represented in the candidate image (414). This identification may be made based on an object identifier associated with the candidate image.

To confirm the match, the system may then perform image comparison again with a second image in which the object is represented (for example, an image showing the object from a different angle from the candidate image). The system may identify such a second image using the object identifier. The system may then compare the query image to the second image (for example, by performing one or more of steps 408-414) on the second image. If the second image corresponds sufficiently to the second image, the object in the candidate image (and second image) may be determined to match the object represented in the query image (418). The determination a match between the second image and the query image may be made using lower threshold(s) than those used to early determine a match between the candidate image and the query image. This may be due to the comparison with the second query being a confirmation step rather than an initial pass. It may also be due to the second image being at an angle of the object that differs more from the query image than the candidate image differed from the query image. The system may also perform confirmation using different image (s) of the received image stream. Such different image(s) may be compared to the candidate image and/or the second image (showing the candidate object from a different angle). If these confirmatory comparison(s) obtain sufficiently high scores, a match may be determined. Results may then be sent to the user (or to some other device or process) based on the match.

The image matching steps described above may be performed for many database images for each query image. Multiple candidate images (and candidate objects) may be determined as matches for object(s) represented in the query image. For example if multiple candidate images are matched to the query image sufficient to produce high enough scores for the candidate images, those candidate images may be determined to be matches. Thus multiple matches may be returned with several different types of results returned by the system. Alternatively, if a single candidate match has a sufficiently high enough confidence score, the single candidate may be determined to be a match and the system may not search additional database images.

Figure 5:
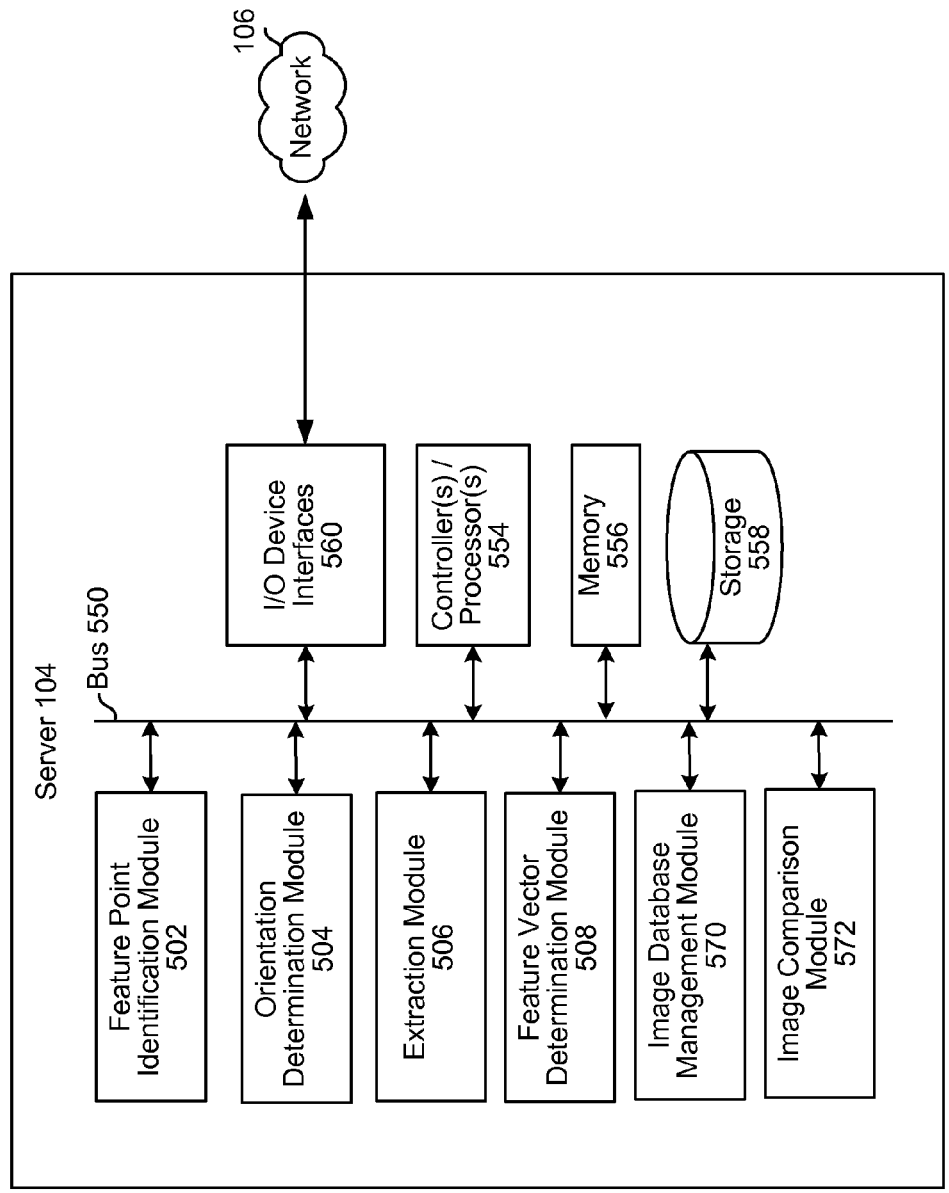
FIG. 5 is a block diagram conceptually illustrating example components of a server of an image matching system according to aspects of the present disclosure.

FIG. 5 is a block diagram conceptually illustrating example components of a server 104 or other computing device to perform the operations discussed herein. In operation, the server 104 may include computer-readable and computer-executable instructions that reside on the server 104, as will be discussed further below. Although illustrated in a server 104, the components/operations discussed herein may be performed over multiple servers, or across multiple other devices, for example with certain operations performed on a mobile device and other operations performed by one or more remote devices (e.g., servers). For example, instead of sending an entire image, a mobile device may perform some pre-processing, such as feature extraction, of an image, with the resulting data sent to a server, thus saving bandwidth.

As illustrated in FIG. 5, the server 104 may include an address/data bus 550 for conveying data among components of the server 104. Each component within the server 104 may also be directly connected to other components in addition to (or instead of) being connected to other components across the bus 550.

The server 104 may include one or more microcontrollers/controllers/processors 554 that may each include a central processing unit (CPU) for processing data and computer-readable instructions, and a memory 556 for storing data and instructions. The memory 556 may include volatile random access memory (RAM), non-volatile read only memory (ROM), non-volatile magnetoresistive (MRAM) and/or other types of memory. The server 104 may also include a data storage component 558, for storing data, such as database images and associated data, and microcontrollers/controller/processor-executable instructions (e.g., instructions to perform one or more steps of the methods illustrated in FIGS. 3-4). The data storage component 558 may include one or more non-volatile storage types such as magnetic storage, optical storage, solid-state storage, etc. The server 104 may also be connected to removable or external non-volatile memory and/or storage (such as a removable memory card, memory key drive, networked storage, etc.) through input/output device interfaces 560.

Computer instructions for operating the server 104 and its various components may be executed by the microcontroller (s)/controller(s)/processor(s) 554, using the memory 556 as temporary "working" storage at runtime. The computer instructions may be stored in a non-transitory manner in non-volatile memory 556, storage 558, or an external device. Alternatively, some or all of the executable instructions may be embedded in hardware or firmware in addition to or instead of software.

The server 104 includes input/output device interfaces 560. A variety of components may be connected through the input/output device interfaces 560. The input/output device interfaces 560 may include an interface for an external peripheral device connection such as universal serial bus (USB), FireWire, Thunderbolt or other connection protocol. The input/output device interfaces 560 may also include a connection to one or more networks 106 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Another device, such as a smartphone 102, may also connect directly to the server 104 via one of these connections.

The server 104 may include a number of logical components that configure an image database and perform image and object matching as described above. An image database management module (IDMM) 570 may manage images stored in the database that are to be matched with incoming query images. The IDMM 570 may communicate with storage 558 which may store the database images and associated data, such as linked object identifiers, etc. The IDMM 510 may configure the category tree as described above.

The server 104 may also include a Feature Point Identification Module (FPIM) 502, an Orientation Determination Module (ODM) 504, an Extraction Module (EM) 506, a Feature Vector Determination Module (FVDM) 508 and a Database (DB) 510. FPIM 502 is used to identify the feature points in the image. ODM 504 and EM 506 use these feature points to determine the orientations of the feature points and extract patches around these feature points, respectively. FVDM 508 uses the patches extracted by EM 506 to determine feature vectors corresponding to these patches. Further, storage 558 may be used to store all the feature points, their orientations and the feature vectors.

FPIM 502 is used to identify the feature points in the image. FPIM may include components to calculate a Harris corner measure at points in an image, to identify local maxima among a set of points at the Harris corner measure, and other techniques to identify feature points. The FPIM 502 may also include components to select feature points and estimate position of feature points. The ODM 504 may determine and manipulate orientations of feature points. EM 506 may take a pyramid image and feature points and extract a patch around the feature points. Those patches may be used by FVDM 508 to define feature vectors corresponding to the patches. FVDM 508 may include components divide the patch into several mini-patches, compute components of the feature vectors corresponding to the mini-patches. The feature vectors may also be normalized by other components of the server 104, not shown.

The server 104 may also include an image comparison module (ICM) 572. The ICM may be configured to find features in the query image that are visually similar to features in a database image. The ICM may compute dot products between the feature vectors of a query image and the feature vectors of database images and determine how those dot products compare to one or more thresholds. The ICM may also determine if pairs of images are geometrically consistent, including testing topological equivalence, performing homographic transformation, computing inliers/outliers, and performing final matching.

Figure 6:
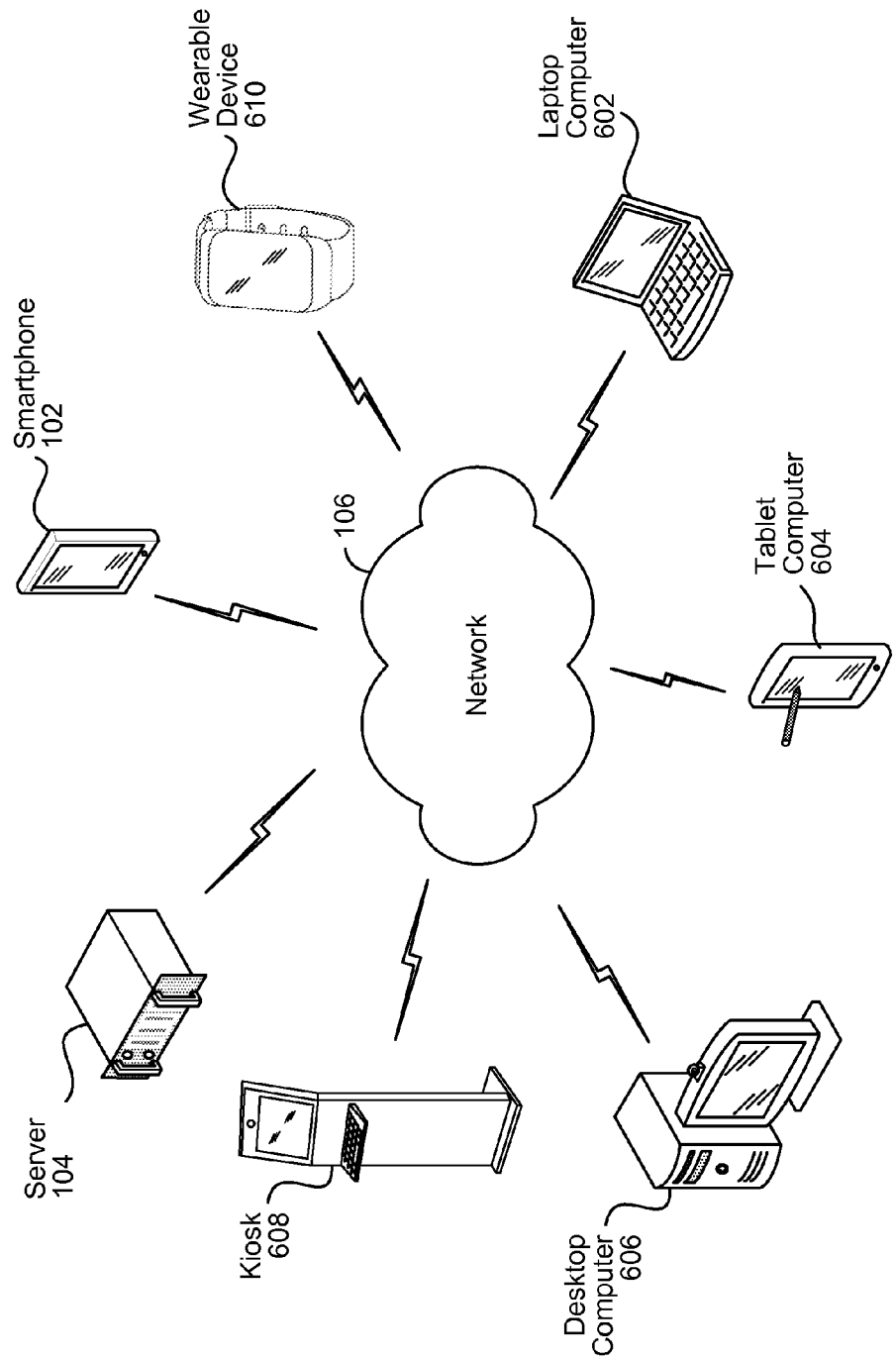
FIG. 6 illustrates a network configuration according to aspects of the present disclosure.

FIG. 6 illustrates a network configuration according to aspects of the present disclosure. One or more servers 104 may communicate over network 106 (or through a different connection) with various other devices including the smartphone 102, laptop computer 602, tablet computer 604, desktop computer 606, kiosk 608, other servers (not shown), or other device via the network 106. As described above, the network 106 may be a wireless local area network (WLAN) (such as WiFi) radio, Bluetooth, infrared (IR), and/or wireless network radio, such as a radio capable of communication with a wireless communication network such as a Long Term Evolution (LTE) network, WiMAX network, 3G network, etc. The server 104 may communicate with these devices to receive images to be processed and stored in the image database, to obtain other information for the image database, to receive query images, to obtain information related to objects to send back to a user, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A method for identifying a three-dimensional object in an image performed by a remote device, the method comprising:
   obtaining a set of images representing a first object from a second device, each image of the set representing the first object from a different point of view;
   storing each image of the set with an identifier of the first object;
   receiving a plurality of images in a video feed from a mobile device, the plurality of images including a representation of a second object;
   selecting a first image from the plurality of images;
   identifying a first plurality of points in the first image;
   determining a representation of the first image based on the first plurality of points;
   identifying a second image to compare to the first image based on the representation, the second image being one of the set of images;
   identifying a second plurality of points in the second image;
   comparing the first plurality of points to the second plurality of points;
   determining the second image to be a candidate for a match of the first image based on comparing the first plurality of points to the second plurality of points;
   in response to determining the second image to be a candidate, selecting a third image from the plurality of images;
   identifying a third plurality of points in the third image;
   comparing the third plurality of points to the second plurality of points;
   determining the second object to be a match for the first object based on comparing the first plurality of points to the second plurality of points and comparing the third plurality of points to the second plurality of points; and
   sending, by the remote device, information about the first object to the mobile device.

2. The method of claim 1, wherein comparing the first plurality of points to the second plurality of points comprises:
   performing geometric verification between point pairs, where each of the point pairs comprises a first point from the first plurality of points and a second point from the second plurality of points; and
   determining, based on the geometric verification, that a number of point pairs have a geometric relationship within a threshold.

3. The method of claim 1, further comprising:
   identifying a fourth image to compare to the first image based on the representation, the fourth image being one of the set of images;
   identifying a fourth plurality of points in the fourth image;
   comparing the fourth plurality of points to the first plurality of points,
   wherein determining the second object to be a match for the first object is further based in part on the comparing the fourth plurality of points to the first plurality of points.

4. A method performed by a first device, comprising:
   receiving a plurality of images from a second device, the plurality of images including a representation of a first object;
   selecting a first image from the plurality of images;
   comparing a first representation of the first image to a representation of a stored second image, the second image representing a second object from a first point of view;
   determining that the first object potentially matches the second object based on the comparing of the first representation of the first image to the representation of the second image;
   selecting a third image from the plurality of images;
   comparing a third representation of the third image to the representation of the stored second image;

determining that the first object corresponds to the second object based on the comparing of the third representation to the representation of the stored second image; and sending, by the first device, information about the first object to the second device.

5. The method of claim 4, wherein comparing the first representation of the first image to the representation of the second image comprises:
identifying a first plurality of points in the first image;
identifying a second plurality of points in the second image; and
comparing the first plurality of points to the second plurality of points.

6. The method of claim 5, wherein comparing the first plurality of points to the second plurality of points comprises performing geometric verification between point pairs, where each of the point pairs comprises a first point from the first plurality of points and a second point from the second plurality of points.

7. The method of claim 6, wherein the geometric verification comprises determining a number of point pairs having a geometric relationship within a threshold.

8. The method of claim 4, further comprising:
identifying a stored fourth image representing the second object from a second point of view;
comparing a representation of the stored fourth image to the representation of the first image, wherein the determining the first object corresponds to the second object is further based on the comparing of the representation of the stored fourth image to the representation of the first image.

9. The method of claim 8, wherein the identifying of the stored fourth image is based on an identifier of the second object.

10. The method of claim 4, further comprising:
determining at least one feature vector describing the first image; and
identifying the second image for comparison based on the at least one feature vector.

11. The method of claim 4, wherein:
identifying the second image comprises traversing a tree of potential images;
the potential images are located on nodes of the tree; and
the tree is configured based on sets of visual features.

12. The method of claim 4, wherein:
the first representation of the first image comprises information about color in the first image; and
the representation of the second image comprises information about color in the second image.

13. A system, comprising:
at least one processor and a memory including instructions operable to be executed by the at least one processor to perform a set of actions, configuring the processor to:
receive a plurality of images from a second device, the plurality of images including a representation of a first object;
select a first image from the plurality of images;
compare a first representation of the first image to a representation of a stored second image, the second image representing a second object from a first point of view;

determine that the first object potentially matches the second object based on the comparing of the first representation of the first image to the representation of the second image;
select a third image from the plurality of images;
compare a third representation of the third image to the representation of the stored second image;
determine that the first object corresponds to the second object based on the comparing of the third representation of the third image to the representation of the stored second image; and
send information about the first object to the second device.

14. The system of claim 13, wherein the processor is configured to compare the first representation of the first image to the representation of the second image by:
identifying a first plurality of points in the first image;
identifying a second plurality of points in the second image; and
comparing the first plurality of points to the second plurality of points.

15. The system of claim 14, wherein the processor is configured to compare the first plurality of points to the second plurality of points by performing geometric verification between point pairs, where each of the point pairs comprises a first point from the first plurality of points and a second point from the second plurality of points.

16. The system of claim 15, wherein the processor is configured to perform the geometric verification by determining a number of point pairs having a geometric relationship within a threshold.

17. The system of claim 13, wherein the at least one processor is further configured to:
identify a stored fourth image representing the second object from a second point of view;
compare a representation of the stored fourth image to the representation of the first image, wherein the determining that the first object corresponds to the second object is further based on the comparing of the representation of the stored fourth image to the representation of the first image.

18. The system of claim 13, wherein the at least one processor is further configured to:
determine at least one feature vector describing the first image; and
identify the second image for comparison based on the at least one feature vector.

19. The system of claim 13, wherein:
identifying the second image comprises traversing a tree of potential images;
the potential images are located on nodes of the tree; and
the tree is configured based on sets of visual features.

20. The system of claim 13, wherein:
the first representation of the first image comprises information about color in the first image; and
the representation of the second image comprises information about color in the second image.

* * * * *